(No Model.)
R. L. STANLEY.
LATHE DOG.
No. 488,927. Patented Dec. 27, 1892.
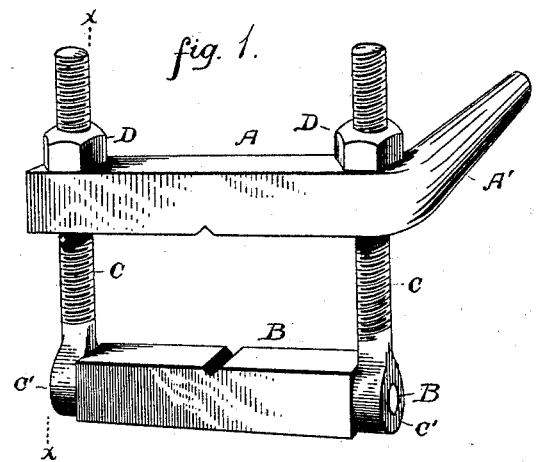
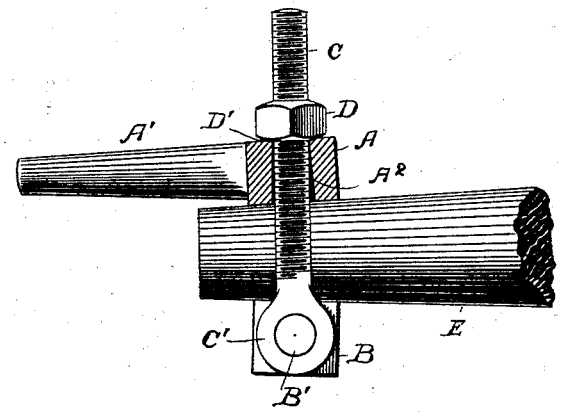
WITNESSES:
M. B. Tillinghast
George A. Fiske, Jr.
INVENTOR
Robert L. Stanley,
BY
A. B. Upham,
HIS ATTORNEY.

UNITED STATES PATENT OFFICE.

ROBERT L. STANLEY, OF SOMERVILLE, ASSIGNOR OF ONE-HALF TO FRANK E. WHITNEY, OF MELROSE, MASSACHUSETTS.

LATHE-DOG.

SPECIFICATION forming part of Letters Patent No. 488,927, dated December 27, 1892.

Application filed March 5, 1892. Serial No. 423,842. (No model.)

*To all whom it may concern:*

Be it known that I, ROBERT L. STANLEY, of Somerville, in the county of Middlesex and State of Massachusetts, have invented a new and useful Improvement in Lathe-Dogs, of which the following, taken in connection with the accompanying drawings, is a specification.

The object of this invention is the construction of a lathe dog which can be clamped upon rods of any moderate taper fully as securely as upon straight bars. To this end, I arrange the clamping-jaws of the dog in such a way that they can have more or less rotation in a plane coincident with the axis of the rod to which the dog is clamped. In other words, the jaws are adapted to rest flat against the opposite sides of the rod no matter how far from parallel such sides may be,—up to a certain limit. In doing this, I have constructed the dog as follows.

Referring to the drawings forming part of this specification, Figure 1 is a perspective view of my lathe dog; and Fig. 2 a cross-section at $x\,x$ in Fig. 1, showing a tapering rod clamped in the dog.

The jaws, A B, of the dog are each preferably formed of bar-steel, rectangular in cross-section. The jaw, A, is prolonged at one end and bent at right angles to form the tail A'. The jaw, B, has its ends terminating in trunnions B'. Fitting upon these trunnions are the eyes C' of the bolts C. The bolts themselves pass loosely through holes, $A^2$, in the jaw A; these holes being preferably somewhat conical, as indicated. Nuts, D, screwing upon the bolts, C, serve to clamp the jaws upon the object, E, between them.

As is readily seen, the rotation of the jaw, B, upon its trunnions, B', permits its clamping face to rest squarely upon any uneven or sloping surface. A partial rotary adjustment of the jaw, A, is secured by the conical form of the holes, $A^2$, through which pass the bolts, C; and by the rounding of the under faces, D', of the nuts D.

Any one who has tried to turn a taper-rod will instantly appreciate the great advantage of a dog whose jaws fit firmly against the conical surface of the rod, and will hence neither slip nor mar the same.

In addition, my lathe-dog is strong and cheap; and, by means of the trunnion-connection of the bolts and jaw B, these bolts will not turn when the nuts are being screwed down.

I am aware that it is old to form a lathe-dog with two bar-jaws held together by means of bolts; and I do not therefore broadly claim the same; but What I do claim and desire to secure by Letters Patent is follows, to wit:

1. In a lathe-dog, the jaw B, having terminal trunnions B', in combination with the bolts, C, having eyes, C', fitting said trunnions, the jaw, A, having holes $A^2$ receiving said bolts, and the nuts D turning upon said bolts, substantially as and for the purpose set forth.

2. In a lathe-dog, the jaw B having terminal trunnions, B', in combination with the bolts C having eyes C' fitting said trunnions, the jaw A having conical holes $A^2$ receiving said bolts, and the nuts D, having rounded faces D', as and for the purpose specified.

In testimony whereof I have signed my name to this specification, in the presence of two subscribing witnesses, on this 1st day of March, A. D. 1892.

ROBERT L. STANLEY.

Witnesses:
 FRANK E. WHITNEY,
 W. A. LISTER.